(12) United States Patent
Schustek et al.

(10) Patent No.: US 6,202,286 B1
(45) Date of Patent: Mar. 20, 2001

(54) METHOD FOR CREATING A JOINT BETWEEN THE EXCITER POLES AND THE POLE CASING OF AN ELECTRIC MACHINE

(75) Inventors: Siegfried Schustek, Ditzingen; Hans-Juegen Kessler, Zaberfeld; Peter Franz, Diekholzen; Wolfgang Kopp; Bernd Kreter, both of Hildesheim, all of (DE); Serafin Balsa Carrera, Santander (ES)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/043,801

(22) PCT Filed: Oct. 1, 1996

(86) PCT No.: PCT/DE96/01888

§ 371 Date: Feb. 16, 1999

§ 102(e) Date: Feb. 16, 1999

(87) PCT Pub. No.: WO97/15107

PCT Pub. Date: Apr. 24, 1997

(30) Foreign Application Priority Data

Oct. 17, 1995 (DE) ................................. 195 38 483

(51) Int. Cl.$^7$ ....................................................... H02K 15/04
(52) U.S. Cl. ............................. 29/596; 29/522.1; 310/42; 310/218
(58) Field of Search ................................... 29/596, 522.1, 29/524.1; 310/42, 218

(56) References Cited

FOREIGN PATENT DOCUMENTS

2488749 * 2/1982 (FR) .

* cited by examiner

Primary Examiner—Carl E. Hall
(74) Attorney, Agent, or Firm—Michael J. Striker

(57) ABSTRACT

The method of making a joint connection between exciter poles and the pole housing of an electrical machine includes positively displacing material of the pole housing (10) pointwise by means of the joining tool into a recess (22) provided in each of the exciter poles (12) at respective joining points to make a form- and force-locking connection of the exciter poles with the pole housing.

10 Claims, 3 Drawing Sheets

METHOD FOR CREATING A JOINT BETWEEN THE EXCITER POLES AND THE POLE CASING OF AN ELECTRIC MACHINE

BACKGROUND OF THE INVENTION

The invention relates to a method for producing a joint connection, in particular between exciter poles and the pole housing of an electrical machine, as well as an electrical machine produced by that method.

In electrical machines that have an electric excitation, it is known to secure the exciter poles that carry the exciter winding to the inside of a substantially cylindrical pole housing. Securing the exciter poles to the pole housing can be accomplished in a known way, for instance by means of a screw connection, welded connection, or adhesively bonded connection. In addition, a method is known from French Patent Application FR 2 488 749, in which exciter poles are secured to the pole housing by means of a force-locking joint connection, in which material of the pole housing is positively displaced into a conical recess of the exciter poles. A disadvantage of this is that the conical recesses can be produced only with great effort using precision tools. To achieve uniform, reliable positive displacement of the material of the pole housing into the conical recess of the exciter poles, which widens toward the bottom, high-precision and thus complicated and expensive adjustment of the joining tools relative to the recess is necessary.

SUMMARY OF THE INVENTION

It is an object of the present invention to provide a method of making articulated connections between exciter poles and a pole housing of an electrical machine and to provide an electrical machine made by that method which does not have the above-described disadvantage.

The method of making the joint connection between the exciter poles and a pole housing of an electrical machine by means of a joining tool includes providing an exciter pole having a recess at a joining point on a pole housing and positively displacing material of the pole housing pointwise by means of the joining tool into the recess of the exciter pole at the joining point to make a form- and force-locking connection of the exciter pole with the pole housing.

With the method of the invention, it is possible by comparison, in a single way, to establish a form- and force-locking connection between the exciter poles and the pole housing, in which a secondary air gap between the exciter poles and the pole housing is reduced to a minimum. Because the material of the pole housing and of the respective exciter pole is positively displaced by the joining tool pointwise at at least one joining point into a corresponding recess of the exciter pole, a force-locking connection between the exciter poles and the pole housing can be attained by means of simple method steps, which can moreover, be performed using a tool of simple construction. High joining forces are brought to bear, which over the long term assure large-area contact of the exciter poles with the pole housing. By imposition of the high joining forces, the gap between the exciter poles and the pole housing is reduced to its technologically feasible minimum. The merely pointwise positive displacement of the material of the pole housing into a corresponding recess of the exciter poles assures that the material loss of the exciter poles is extremely slight, thereby essentially precluding an impairment of these electromagnetic properties.

Advantageous features of the invention will become apparent from the characteristics recited in the dependent claims.

BRIEF DESCRIPTION OF THE DRAWING

The objects, features and advantages of the invention will now be illustrated in more detail with the aid of the following description of the preferred embodiments, with reference to the accompanying figures in which:

FIG. 1 in a sectional view shows a detail of a pole housing 10 and an exciter pole 12 of an electrical machine not shown in its entirety. The electrical machine as a rule has four or six exciter poles 12, which are disposed along the inside circumference of the cylindrically embodied pole housing 10. The fragmentary view of one exciter pole 12 is intended for purposes of clear illustration of the method for producing a joint connection between the pole housing 10 and the exciter poles 12. The exciter poles 12 are disposed over the circumference of a mandrel 14, which is a component of a joining apparatus. The exciter poles 12 are provided beforehand with the exciter windings, not shown here, and locked in a suitable way over the circumference of the mandrel 14. The mandrel 14 with the exciter poles 12 is then moved into the pole housing 10. In this process, either a relative motion of the mandrel 14, having the exciter poles 12, to the pole housing 10 or a relative motion of the pole housing 10 to the fixedly positioned exciter poles 12, or both can occur. The joining apparatus also has a tool holder 16, which has at least one tool guide 18 for a joining tool 20. The joining tool can be subjected to a joining force F by means of a suitable device, such as a hydraulic or pneumatic device.

Figure 1:
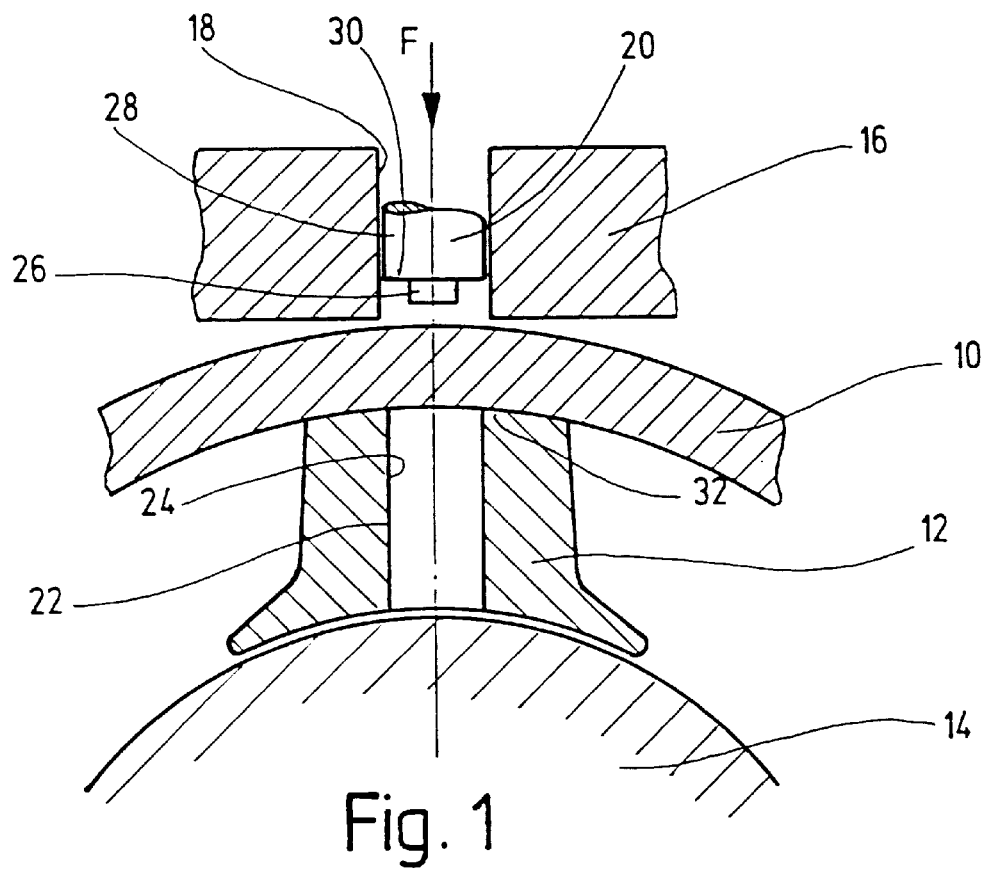
FIG. 1 is a schematic cross-sectional view through a connection point between an exciter pole and a pole housing prior to joining operation.

Positioning of the pole housing 10 and/or of the mandrel 14 having the exciter poles 12 is done in such a way that one recess 22 made previously in the exciter poles 12 is associated with each joining tool 20. In a preferred exemplary embodiment, the joining tool 20 is a circular die, with which a corresponding bore 24 (recess 22) is thus associated. The bore 24 may—as shown in FIG. 1—be embodied as a through bore, and in a further exemplary embodiment it may be a blind bore. Moreover, in exemplary embodiments not shown, the contours corresponding to one another of the joining tool 20 and the recess 22 may have other than a circular shape. For instance, oval or polygonal cross sections are possible. Moreover, more than one recess 22 may be provided per exciter pole 12, in which case the recesses are spaced apart axially from one another, for example. For such an embodiment, the joining apparatus then has a suitable number of joining tools 20.

The joining tool 20 is embodied with two stages; that is, it has a first portion 26 of smaller diameter and an adjoining portion 28 of larger diameter. The portions 26 and 28 merge with one another via an annular shoulder 30. The annular shoulder 30, in the example shown, is disposed at a right angle to the action of the joining force F. In other exemplary embodiments, not shown, the annular shoulder 30 may have a conical shape.

Figure 2:
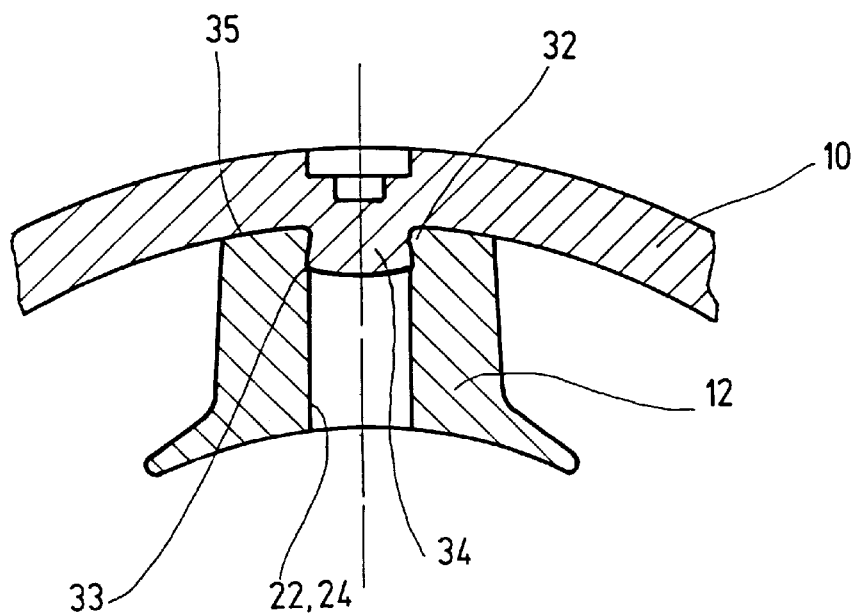
FIG. 2 is schematic cross-sectional view through a connection point of FIG. 1 after completion of the joining operation.

Once the exciter pole 12 or pole housing 10 is positioned, the joining tool 20 is acted upon by the joining force F. This presses the pole housing 10 against the exciter poles 12. The mandrel 14 serves as a thrust bearing for the joining force F. In a first method step, the joining tool 20 with its portion 26 touches the pole housing 10 and in the process positively displaces a certain quantity of material of the pole housing 10—depending on the dimensioning of the portion 26—into the recess 22 located opposite the joining tool 20. Maintaining the joining force F puts the annular shoulder 30 into touch contact with the pole housing 10, so that the joining force F is now introduced into the pole housing 10 via the larger-diameter portion 28. The result is thus—depending on the size of the annular shoulder 30—an additional two-dimensional pressure on the pole housing 10, so that an upper edge 32 of the recess 22 is forced into the recess 24 in response to the joining force F. This forcing of the edge 32 into the recess 22, as shown in further detail in FIG. 2, undercuts the material previously positively displaced via the portion 26 of the joining tool 40, and this material forms a rivet 34. It is clear from the finished joint connection shown in FIG. 2 that as a result of the undercut 33 of the edge 32, which is made of the material of the exciter pole 12, the rivet 34 positively displaced from the material of the pole housing 10 is firmly fastened in place. As a result of the strong forces occurring during the joining according to the invention, the exciter poles 12 are positively displaced in the direction of the pole housing 10, so that a gap 35 remaining between the exciter poles 12 and the pole housing 10 remains limited to its technically feasible minimum.

The form- and force-locking connection between the exciter poles 12 and the pole housing 10 is durably preserved even after removal from the joining apparatus. Because the recess 22 and the joining tool 20 are for instance embodied as circular, the rivet 34 is constricted, or in other words undercut, along a circumferential line along the edge 32. Thus forces engaging in the axial direction of the exciter poles can also be reliably absorbed during the intended use of the electrical machine without causing loosening and thus an enlargement of the gap 35. Depending on the number of connection points selected between 1 exciter pole 12 and the pole housing 10, a secure, firm connection can be durably assured.

Figure 3:
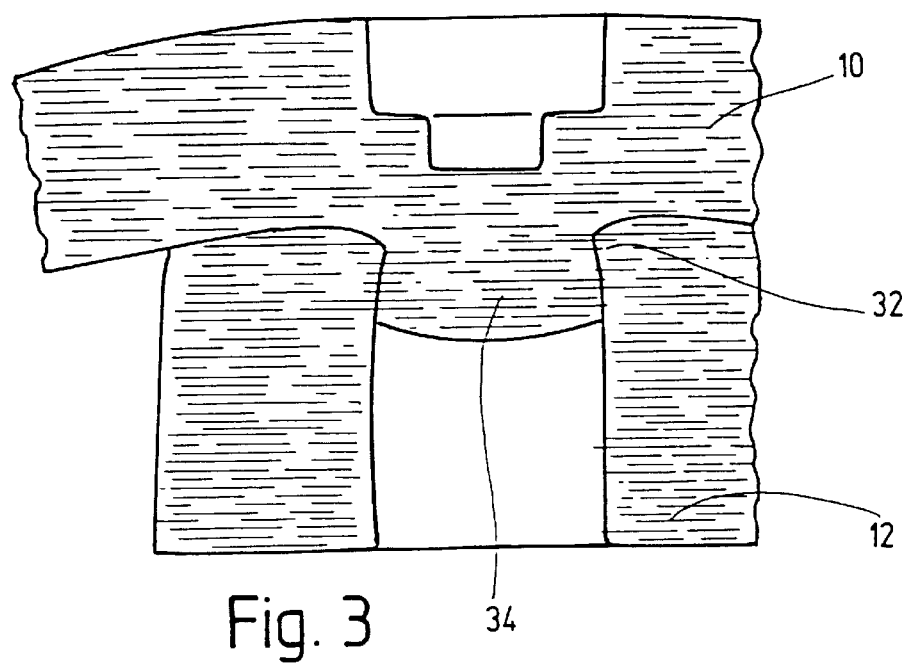
FIG. 3 is a diagram of a micrograph of the joining point of the invention.

The micrograph of the connection point between the pole housing 10 and the exciter pole 12 shown in FIG. 3 clearly shows how the edge 32 undercuts the rivet 34. It has been positively displaced into the rivet 34 from the material of the pole housing 10.

Figure 4:
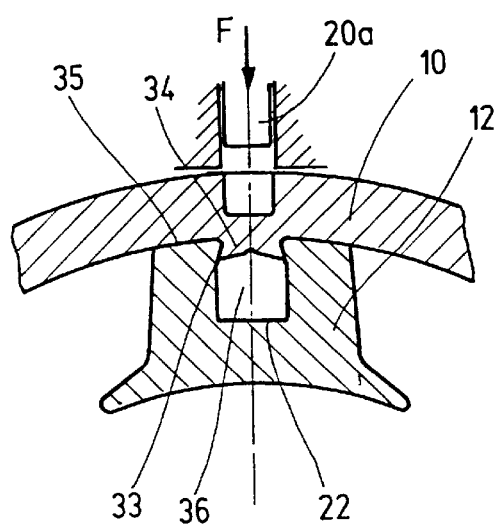
FIG. 4 is a cross-sectional view of another embodiment of a connection point prior to the joining operation.
Figure 5:
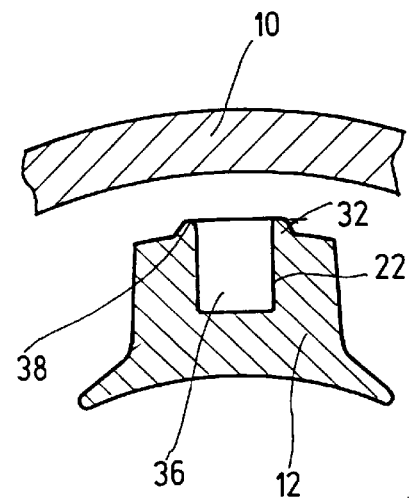
FIG. 5 is a cross-sectional view through a connection point of FIG. 4 after the joining operation.

In FIGS. 4 and 5, a further variant embodiment for making a joint connection between the exciter pole 12 and the pole housing 10 is shown. Identical elements to those of FIG. 1 are identified by the same reference numerals and will not be explained again. For the sake of simplicity, the joining apparatus has not been shown. It is clear from FIG. 5 that the recess 22 may be embodied as a blind bore 36. Very advantageously, the blind bore 36 can be introduced into the exciter pole 12 by means of a so-called pan, whereupon the edge 32 is simultaneously thrown out in the form of a bead 38 encompassing the recess 22.

From the joint connection shown in FIG. 4 between the pole housing 10 and the exciter pole 12, it becomes clear that in the joining operation (here the joining can be done with a single-stage swaging die 20a) the bead 38 is positively displaced into the recess 22 by the joining force F, so that the rivet 34 positively displaced into the recess 22 by the joining tool is likewise constricted or undercut by the edge 32 of the exciter pole 12. Thus once again a durable form- and force-locking connection between the exciter poles 12 and the pole housing 10 is possible. The rivet 34 is firmly fastened in place by the undercut 33, and once again a tensile force between the pole housing 10 and the exciter poles 12 is built up, so that the gap 35 is still reduced to its minimum. This averts the creation of secondary air gaps.

Figure 6:
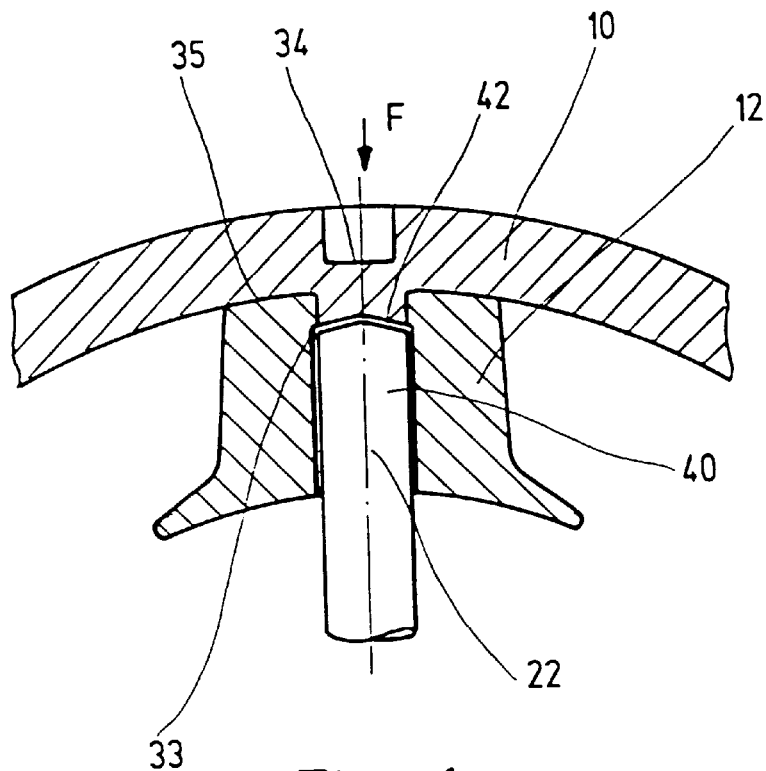
FIG. 6 is a cross-sectional view of an additional embodiment of a connection point prior to the joining operation.

FIG. 6 is a schematic illustration through a further joint connection. Once again, identical elements are provided with the same reference numerals and not explained again. In the exemplary embodiment shown here, the recess 22 of the exciter pole 12 is once again embodied as a through bore. During the joining process explained in conjunction with FIGS. 1–3, when the joining force F engages the recess 22 a counterpart die 40 is stopped, which on its end toward the pole housing 10 has a conical bevel 42. The effect achieved by this is that during the joining, the material of the pole housing 10 that forms the rivet 34 and is positively displaced into the recess 22 runs up against the conical face 42 of the counterpart die 40 and is positively displaced laterally. Once again, this creates the undercut 33, which assures a secure form- and force-locking connection between the exciter pole and the pole housing 10.

Figure 7:
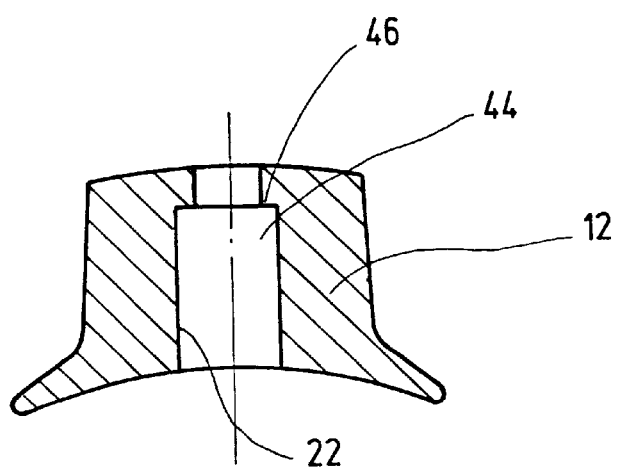
FIG. 7 is a cross-sectional view through a further embodiment of an exciter pole.

A further variant embodiment of the recess 22 of the exciter pole 12 is shown in FIG. 7. Here, for the sake of clarity, only the exciter pole 12 is shown in a sectional view. The recess 22 is embodied as a stepped bore 44, which on its side toward the pole housing 10 merges via a shoulder 46 with a smaller-diameter portion. The result attained is that the positively displaced material of the pole housing 10 that forms the rivet 34 is positively displaced underneath the shoulder 46, when it runs up against a counterpart die not shown here, so that once again an undercut 33 is created.

In summary, it becomes clear that it is a common feature of all the exemplary embodiments that by means of an easily performed so-called swage riveting or punch riveting operation, a simple and durable joint connection between the exciter poles 12 and the pole housing 10 can be created, which in particular by the embodiment of an undercut 33 is durably form- and force-locking. The embodiment of the undercut 33 can be attained by means of a special embodiment of either the recess 22 or the joining tool 20 or both. In all the exemplary embodiments, the joint connection is established in both force- and form-locking fashion with only a single working stroke of the joining tool embodied as a swaging die.

What is claimed is:

1. A method of making a joint connection between exciter poles and a pole housing of an electrical machine by means of a joining tool, said method comprising the steps of:
   a) providing an exciter pole (12) having a recess (22) at a joining point on a pole housing (10); and
   b) positively displacing material of the pole housing (10) and of the exciter pole (12) pointwise by means of joining tool (20) into said recess (22) of said exciter pole (12) at said joining point to make a form- and force-locking connection of the exciter pole (12) with the pole housing (10).

2. The method as defined in claim 1, wherein the material of the pole housing (10) is positively displaced into the recess (22) by punch riveting using a die (20).

3. The method as defined in claim 1, further comprising positively displacing an outer edge (32) of the recess (22) of the exciter pole (12) into the material of the pole housing (10).

4. The method as defined in claim 2, wherein said die is a two-stage swaging die (20).

5. The method as defined in claim 1, wherein said exciter pole (12) is provided with a bead (38) extending circumferentially around an outer edge (32) of the recess (22) and said bead (38) is at least partially positively displaced into the material of the pole housing (10) which forms a rivet (34).

6. The method as defined in claim 5, further comprising making the recess (22) in the exciter pole (12) and creating said bead (38) during the making of the recess (22).

7. The method as defined in claim 1, wherein said recess (22) is a blind bore (36).

8. The method as defined in claim 1, wherein said recess (22) is a throughgoing bore (24).

9. The method as defined in claim 1, wherein said positively displacing said material of said pole housing occurs by means of a joining force (F) and further comprising applying a retaining force counter to said joining force by means of an assembly support of the exciter pole.

10. A method of making a joint connection between exciter poles and a pole housing of an electrical machine by means of a joining tool, said method comprising the steps of:
 a) providing an exciter pole (12) having a recess (22) at a joining point on a pole housing (10); and
 b) positively displacing material of the pole housing (10) and of the exciter pole (12) pointwise by means of joining tool (20) into said recess (22) of said exciter pole (12) at said joining point to make a form- and force-locking connection of the exciter pole (12) with the pole housing (10), so that a rivet (34) is displaced into said recess (22) from the pole housing (10) and an edge (32) of the recess (22) is displaced into a recess (24) during a joining process, and also an undercut (33) of the rivet (34) is produced.

* * * * *